US012800294B2

(12) United States Patent
Nakajima

(10) Patent No.: US 12,800,294 B2
(45) Date of Patent: Nov. 17, 2026

(54) MEASUREMENT MACHINE

(71) Applicant: MITUTOYO CORPORATION, Kanagawa (JP)

(72) Inventor: Yuki Nakajima, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 96 days.

(21) Appl. No.: 18/911,625

(22) Filed: Oct. 10, 2024

(65) Prior Publication Data

US 2025/0123097 A1 Apr. 17, 2025

(30) Foreign Application Priority Data

Oct. 11, 2023 (JP) ................................. 2023-176175

(51) Int. Cl.
*G01B 11/24* (2006.01)

(52) U.S. Cl.
CPC .......... *G01B 11/24* (2013.01); *G01B 2210/56* (2013.01)

(58) Field of Classification Search
CPC ........................... G01B 11/00; G01B 2210/56; G01B 2290/70; G01B 9/02018; G01B 9/02059; G01B 9/02007; G01B 9/02003; G01B 11/272; G01B 11/14; G01B 11/002; G01B 9/02027; G01B 9/02019; G01B 11/0608; G01B 11/24; G01B 11/02; G01B 21/042; G01B 11/0641; G01B 9/02061; G01B 11/0625; G01B 9/02083; G01B 21/00; G01B 9/02084; G01B 11/06; G01B 11/26; G01B 9/02; G01B 11/2441; G01B 9/02058; G01B 2290/45; G01B 9/02021; G01B 11/0675; G01B 9/0207; G01B 9/02002; G01B 2290/15; G01B 2290/60; G01B 9/0209; G01B 9/02072; G01B 11/306; G01B 11/303; G01B 11/27; G01B 9/02075; G01B 11/03; G01B 9/02029; G01B 11/0633; G01B 7/14; G01B 9/02057; G01B 11/30; G01B 9/02068; G01B 13/12; G01B 15/00; G01B 21/30; G01B 21/32;

(Continued)

(56) References Cited

U.S. PATENT DOCUMENTS

| | | | | |
|---|---|---|---|---|
| 6,369,886 B2 * | 4/2002 | Ishikawa | ............. | G03F 7/70616 356/237.4 |
| 7,180,585 B2 * | 2/2007 | Kreh | .................. | G01N 21/8806 356/237.4 |

(Continued)

FOREIGN PATENT DOCUMENTS

| | | | |
|---|---|---|---|
| CN | 108535270 A * | 9/2018 | ............. G01N 21/88 |
| CN | 116890349 A * | 10/2023 | .............. B25J 11/00 |

(Continued)

*Primary Examiner* — Michael P Stafira
(74) *Attorney, Agent, or Firm* — Greenblum & Bernstein, P.L.C.

(57) ABSTRACT

The measurement machine includes: a holding section where a measurement target is held; a measurement unit (a first measurement unit and a second measurement unit) disposed at a position facing the holding section and provided with sensors that is configured to perform a measurement process on the measurement target; a frame whose position with respect to the holding section is fixed; and a plurality of arms coupling the frame with the measurement unit.

6 Claims, 6 Drawing Sheets

(58) Field of Classification Search

CPC ........................... G01B 9/02098; G01B 11/25; G01B 9/02028; G01B 9/02049; G01B 11/0683; G01B 11/0691; G01B 15/02; G01B 2290/55; G01B 9/02042; G01B 9/02091; G01B 21/16; G01B 5/30; G01B 9/04; G01B 11/022; G01B 11/22; G01B 11/2527; G01B 7/003; G01B 7/30; G01B 9/02045; G01B 9/02087; G01B 11/161; G01B 11/245; G01B 13/00; G01B 21/02; G01B 7/00; G01B 7/023; G01B 7/085; G01B 7/105; G01B 11/043; G01B 11/254; G01B 5/0004; G01B 5/28; G01B 1/026; G01B 11/028; G01B 13/16; G01B 21/047; G01B 7/004; G01B 9/02011; G01B 9/02032; G01B 9/02055; G01B 11/16; G01B 11/2518; G01B 11/285; G01B 13/04; G01B 13/065; G01B 15/08; G01B 21/24; G01B 2290/50; G01B 9/02038; G01B 9/02044; G01B 9/02085; G01B 11/0616; G01B 11/12; G01B 11/167; G01B 11/2408; G01B 2210/50; G01B 9/02074; G01B 11/0658; G01B 21/045; G01B 21/12; G01B 21/20; G01B 7/012; G01B 7/063; G01B 7/10; G01B 7/26; G01B 7/34; G01B 9/0201; G01B 9/02034; G01B 9/02052; B25J 11/0095; B25J 9/042; B25J 15/0014; B25J 13/08; B25J 9/1692; B25J 15/0052; B25J 9/1697; B25J 15/0616; B25J 11/00; B25J 19/02; B25J 9/1674; B25J 9/1664; B25J 9/163; B25J 9/043; B25J 5/007; B25J 9/16; B25J 9/04; B25J 15/08; B25J 9/104; B25J 9/1679; B25J 9/06; B25J 19/021; B25J 19/023; B25J 9/0087; B25J 11/005; B25J 9/126; B25J 9/162; B25J 13/088; B25J 9/12; B25J 13/087; B25J 18/00; B25J 15/00; B25J 15/0028; B25J 18/04; B25J 9/106; B25J 9/1612; B25J 9/0081; B25J 9/041; B25J 9/161; B25J 15/0033; B25J 19/0029; B25J 9/046; B25J 9/1676; B25J 11/008; B25J 19/0095; B25J 9/1694; B25J 19/00; B25J 9/1653; B25J 9/1666; B25J 1/04; B25J 3/006; B25J 15/0019; B25J 19/0075; B25J 9/1682; B25J 11/0025; B25J 15/0253; B25J 9/0018; B25J 15/0658; B25J 18/02; B25J 9/0084; B25J 9/0009; B25J 9/08; B25J 9/102; B25J 9/1602; B25J 21/00; B25J 9/0006; B25J 9/10; B25J 9/1633; B25J 13/086; B25J 19/027; B25J 19/06; B25J 9/023; B25J 11/0085; B25J 15/0004; B25J 15/0095; B25J 15/04; B25J 5/02; B25J 9/1689; B25J 13/02; B25J 15/0293; B25J 17/00; B25J 18/025; B25J 19/022; B25J 9/02; B25J 9/108; B25J 9/1656; B25J 13/00; B25J 15/0057; B25J 19/0054; B25J 5/00; B25J 9/105; B25J 9/109; B25J 9/123; B25J 9/1651; B25J 13/06; B25J 13/085; B25J 15/0009; B25J 15/103; B25J 15/12; B25J 9/107; B25J 9/1669; B25J 11/0075; B25J 13/084; B25J 15/0085; B25J 15/0683; B25J 9/00; B25J 9/1661; B25J 9/1687; B25J 13/083; B25J 13/089; B25J 15/022; B25J 15/0233; B25J 15/024; B25J 15/0408; B25J 15/0425; B25J 15/0433; B25J 15/0491; B25J 15/06; B25J 15/0608; B25J 19/0079; B25J 19/0091; B25J 9/0096; B25J 9/044; B25J 9/1035; B25J 9/1045; B25J 9/1605; B25J 9/1617; B25J 9/1628; B25J 9/1638

See application file for complete search history.

(56) References Cited

U.S. PATENT DOCUMENTS

| | | | | |
|---|---|---|---|---|
| 2002/0017599 | A1 * | 2/2002 | Shimizu | H10P 72/0606 250/208.1 |
| 2007/0103749 | A1 * | 5/2007 | Shahar | G02B 26/101 359/18 |
| 2012/0113243 | A1 * | 5/2012 | Srocka | H10P 72/0616 348/142 |
| 2014/0043602 | A1 * | 2/2014 | Engel | G01N 21/88 356/237.5 |
| 2017/0284788 | A1 | 10/2017 | Kannaka et al. | |
| 2019/0240831 | A1 * | 8/2019 | Bonora | B25J 11/0095 |
| 2023/0105983 | A1 * | 4/2023 | Gatt | G01N 21/956 356/237.5 |
| 2023/0296991 | A1 * | 9/2023 | Hamasaki | G03F 7/70683 356/401 |
| 2024/0167968 | A1 * | 5/2024 | Kikuchi | G01N 23/20025 |

FOREIGN PATENT DOCUMENTS

| | | | | | |
|---|---|---|---|---|---|
| JP | H10510366 | A | * | 10/1998 | G01B 11/24 |
| JP | 2016-70691 | A | | 5/2016 | |
| KR | 100910948 | B1 | * | 8/2009 | H10P 72/53 |
| KR | 102147777 | B1 | * | 8/2020 | B25J 19/021 |
| WO | WO-2019235021 | A1 | * | 12/2019 | G01B 21/00 |

* cited by examiner

MEASUREMENT MACHINE

CROSS REFERENCE TO RELATED APPLICATIONS

The entire disclosure of Japanese Patent Application No. 2023-176175 filed Oct. 11, 2023 is expressly incorporated by reference herein.

TECHNICAL FIELD

The present invention relates to a measurement machine that measures a shape of a measurement target.

BACKGROUND ART

Conventionally, as a measurement machine that measures a shape of a measurement target, a measurement machine that is provided with measurement sensors held by a frame is known (e.g., see Literature 1: JP 2016-70691 A).

The measurement machine described in Literature 1 includes a first distance sensor supported by a support section above a movable stage on which the measurement target is placed. The measurement machine described in Literature 1 also includes a second distance sensor supported by the support section below the movable stage. In this measurement machine, the shape of the measurement target is acquired by calculating a thickness of the measurement target on the basis of a distance to an upper surface of the measurement target measured by the first distance sensor and a distance to a lower surface of the measurement target measured by the second distance sensor.

In the measurement machine described in Literature 1, the measurement sensors (the first distance sensor and the second distance sensor) are fixed to the support section having a frame shape. However, maintenance of the measurement sensors with respect to the stage is sometimes performed depending on installation environment of the measurement machine and the like. In the measurement machine described in Literature 1, it is difficult to perform the maintenance because the measurement sensors are directly fixed to the support section.

Especially, in manufacturing a wafer such as a Wafer Level Optics (WLO) to be mounted on a small appliance such as a mobile phone, it becomes necessary to precisely measure a front surface and a rear surface of the wafer that is a measurement target. In this case, in order to simultaneously measure shapes of the front surface and the rear surface at a predetermined point of the wafer, it is necessary to accurately align a measurement sensor for the front surface and a measurement sensor for the rear surface. In such a configuration in which the two measurement sensors (the first distance sensor and the second distance sensor) are fixed to the frame-shaped support section as described in Literature 1, a space between the frame and the measurement sensors is narrow, which makes access to the measurement sensors more difficult.

SUMMARY OF THE INVENTION

An object of the invention is to provide a measurement machine that facilitates maintenance such as position adjustment of measurement sensors configured to measure a measurement target.

A measurement machine according to a first aspect of the invention includes: a holding section where a measurement target is held; a measurement unit provided at a position facing the holding section and including a sensor, the sensor being configured to perform a measurement process on the measurement target; a frame; and a plurality of arms that couples the frame with the measurement unit.

According to an arrangement described above, even if a position and posture of the measurement unit with respect to the frame in the measurement machine need to be finely adjusted, the position and posture of the measurement unit can be easily adjusted by finely adjusting an angle, a length and the like of each of the plurality of arms. In addition, since the frame and the measurement unit are spaced apart from each other by the arms interposed therebetween, access to the measurement unit from a space between the frame and the measurement unit is easily made, which makes it possible to easily perform maintenance.

In the measurement machine according to the above aspect, given that a direction extending from the measurement unit toward the measurement target is defined as a Z direction, a direction orthogonal to the Z direction is defined as an X direction, and a direction extending from the frame toward the measurement unit and being orthogonal to the X direction and the Z direction is defined as a Y direction, the plurality of arms preferably include a plurality of Z-axis support arms arranged along the Z direction and a plurality of X-axis support arms arranged along the X direction.

According to an arrangement described above, a change in posture of the measurement unit can be inhibited by the Z-axis support arms and the X-axis support arms.

In the measurement machine according to the above aspect, it is preferable that the measurement unit includes a first measurement unit and a second measurement unit, the first measurement unit being disposed at a position facing a first surface of the measurement target held by the holding section, the second measurement unit being disposed at a position facing a second surface of the measurement target held by the holding section, the second surface being opposite to the first surface, and each of the first measurement unit and the second measurement unit is coupled with the frame by the plurality of arms.

According to an arrangement described above, surface shapes of the first surface and the second surface of the measurement target can be simultaneously measured.

In the measurement machine according to the above aspect, it is preferable that the plurality of the Z-axis support arms include a plurality of first Z-axis support arms that support the first measurement unit and a plurality of second Z-axis support arms that support the second measurement unit, in a projection viewed from the X direction, the plurality of first Z-axis support arms and the plurality of second Z-axis support arms are respectively arranged at positions to be symmetrical with respect to a reference line, the reference line including a middle point between the first measurement unit and the second measurement unit and being parallel to the Y direction, fixed positions of the first Z-axis support arms to the frame and fixed positions of the second Z-axis support arms to the frame are arranged side by side on a first imaginary line parallel to the Z direction, the second Z-axis support arms being symmetrical to the first Z-axis support arms with respect to the reference line, and fixed positions of the first Z-axis support arms to the first measurement unit and fixed positions of the second Z-axis support arms to the second measurement unit are arranged side by side on a second imaginary line parallel to the Z direction, the second Z-axis support arms being symmetrical to the first Z-axis support arms with respect to the reference line.

According to an arrangement described above, a dimensional change such as distortion of the frame caused by a temperature change can be absorbed by means of the first Z-axis support arms and the second Z-axis support arms, and thus deviation in a positional relationship between the first measurement unit and the second measurement unit due to the dimensional change of the frame and generation of measurement errors caused thereby can be inhibited.

In the measurement machine according to the above aspect, it is preferable that the plurality of the X-axis support arms include a plurality of first X-axis support arms that support the first measurement unit and a plurality of second X-axis support arms that support the second measurement unit, the plurality of first X-axis support arms and the plurality of second X-axis support arms are respectively arranged at positions to be symmetrical with respect to a reference plane, the reference plane including a middle point between the first measurement unit and the second measurement unit in the Z direction and being parallel to an XY plane, fixed positions of the first X-axis support arms to the frame and fixed positions of the second X-axis support arms to the frame have a same coordinate in the X direction, the second X-axis support arms being symmetrical to the first X-axis support arms with respect to the reference plane, and fixed positions of the first X-axis support arms to the first measurement unit and fixed positions of the second X-axis support arms to the second measurement unit have a same coordinate in the X direction, the second X-axis support arms being symmetrical to the first X-axis support arms with respect to the reference plane.

Accordingly, in a similar manner to the arrangement described above, the dimensional change such as the distortion of the frame caused by the temperature change can be absorbed by means of the first X-axis support arms and the second X-axis support arms, and thus the deviation in the positional relationship between the first measurement unit and the second measurement unit due to the dimensional change of the frame and generation of measurement errors caused thereby can be inhibited.

In the measurement machine according to the above aspect, it is preferable that the plurality of arms are each configured so that a length of the arm in a longitudinal direction is extendable and contractable.

According to an arrangement described above, the position and posture of the measurement unit with respect to the frame can be easily adjusted by extending and contracting the arms.

In the measurement machine according to the above aspect, it is preferable that the plurality of arms each include an arm with an elongated shape, and an arm fixing mechanism provided at at least one of an end of the arm close to the frame or another end of the arm close to the measurement unit in a longitudinal direction of the arm, and the arm fixing mechanism includes a fixed piece fixed to the frame or the measurement unit, an arm support part that pivotally supports the arm, and an adjustment unit which couples the fixed piece with the arm support part and by which a position of the arm support part is moved toward and away from the fixed piece along the longitudinal direction of the arm.

The arm support part can be moved toward and away from the fixed piece by operating the adjustment section, and the length of each of the arms can be easily adjusted.

DETAILED DESCRIPTION

An exemplary embodiment of the invention will be described below.

Figure 1:
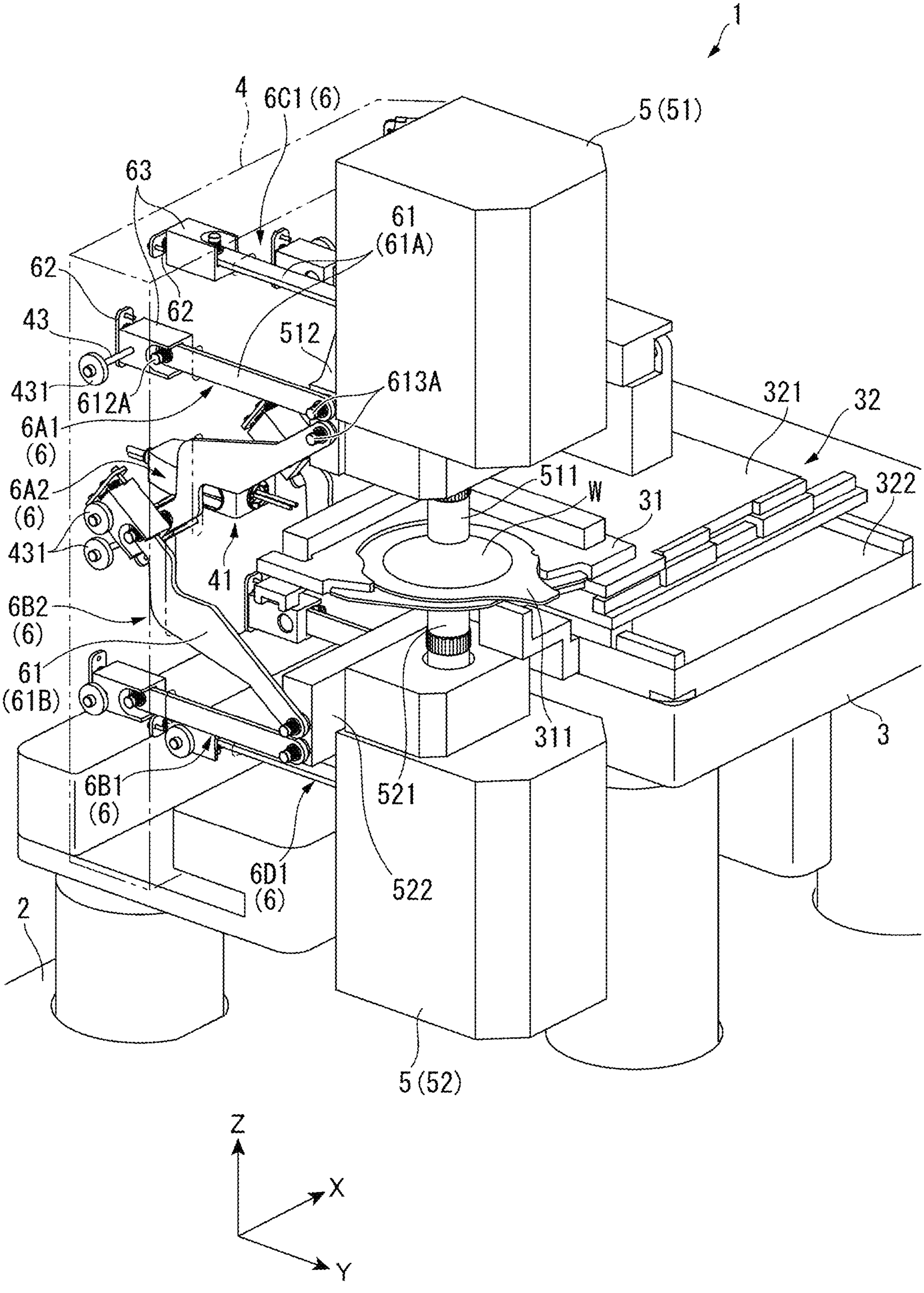
FIG. 1 is a perspective view illustrating a measurement machine according to an exemplary embodiment of the invention.

FIG. 1 is a perspective view illustrating a measurement machine 1 according to the exemplary embodiment.

The measurement machine 1 of the exemplary embodiment is a measurement machine configured to measure a shape of a Wafer Level Optics (WLO). As illustrated in FIG. 1, the measurement machine 1 includes a table 3 fixed to a base 2, a frame 4, a measurement unit 5 (a first measurement unit 51 and a second measurement unit 52) connected to the frame 4 through arms 6.

Configuration of Table 3

The table 3 is provided with a holding section 31 that holds a measurement target W (the WLO in the exemplary embodiment), and a movement mechanism 32 that moves the holding section 31 in a horizontal direction (X and Y directions). In the exemplary embodiment, a shape of a +Z surface (first surface) of the measurement target W held by the holding section 31 is measured by the first measurement unit 51, and a shape of a −Z surface (second surface) of the measurement target W is measured by the second measurement unit 52. Therefore, the holding section 31 is provided with a hole penetrating in a Z direction, and for instance, the measurement target W held by a holder 311 is placed on the holding section 31.

The movement mechanism 32 includes an X-axis movement mechanism 321 that moves the holding section 31 in the X direction and a Y-axis movement mechanism 322 that moves the holding section 31 in the Y direction. A configuration of each of the X-axis movement mechanism 321 and the Y-axis movement mechanism 322 is not limited in particular, and any mechanism may be employed as long as the mechanism is configured to move the holding section 31 in the X and Y directions. Configuration examples of the X-axis movement mechanism 321 may include a configuration provided with an X rail parallel to the X direction and arranged at a support mount fixed to the base 2, an X slider movable along the X rail in the X direction, and an X actuator for moving the X slider in the X direction. Configuration examples of the Y-axis movement mechanism 322 may include a configuration provided with a Y rail arranged at the X slider and parallel to the Y direction, a Y slider movable along the Y rail in the Y direction, and a Y actuator for moving the Y slider in the Y direction.

The movement mechanism 32 is controllable by a controller (not illustrated), and moves the measurement target W held by the holding section 31 in the X direction and the Y direction between the first measurement unit 51 and the second measurement unit 52 under control of the controller. Accordingly, a measurement position of the measurement target W to be measured by the first measurement unit 51 and the second measurement unit 52 can be moved.

Configuration of Measurement Unit 5

The measurement unit 5 includes the first measurement unit 51 and the second measurement unit 52.

The first measurement unit 51 is disposed in a +Z direction of (i.e. above) the table 3, and includes a first measurement sensor 511 and a first plate 512.

In the exemplary embodiment, a structured illumination microscope (SIM) sensor suitable for measurement of the WLO is used as the first measurement sensor 511. The SIM sensor is capable of easily performing highly accurate measurement of the measurement target W having a low reflectance (being light-transmissive) such as the WLO. The first measurement sensor 511 has a measurement axis parallel to the Z direction and a measurement direction toward a −Z direction. Thus, the first measurement sensor 511 is capable of performing shape measurement of an upper surface (+Z surface) of the measurement target W in a state where the measurement target W is held by the holding section 31 of the table 3.

The first plate 512 is a fixing plate to which the first measurement sensor 511 is fixed, and is disposed in a −Y direction (close to a back surface) of the first measurement sensor 511, i.e., disposed at a position facing the frame 4. Although details will be described later, the first plate 512 is coupled with the frame 4 through a plurality of the arms 6. It should be noted the first plate 512 may be integrated with the first measurement sensor 511.

The second measurement unit 52 is disposed in the −Z direction of (i.e. below) the table 3, and includes a second measurement sensor 521 and a second plate 522.

In the exemplary embodiment, the SIM sensor is used as the second measurement sensor 521, as with the first measurement sensor 511. The second measurement sensor 521 has a measurement axis parallel to the Z direction and a measurement direction toward the +Z direction. Thus, the second measurement sensor 521 is capable of performing shape measurement of a lower surface (−Z surface) of the measurement target W in a state where the measurement target W is held by the holding section 31 of the table 3.

The second plate 522 is a fixing plate to which the second measurement sensor 521 is fixed, and is disposed in the −Y direction (close to a back surface) of the second measurement sensor 521, i.e., disposed at a position facing the frame 4. The second plate 522 is coupled with the frame 4 through a plurality of the arms 6, as with the first plate 512. It should be noted the second plate 522 may be integrated with the second measurement sensor 521.

Configuration of Frame 4

The frame 4 is fixed to the base 2. Here, the frame 4 may be directly fixed to the base 2, or may be fixed thereto through another member such as the table 3. The frame 4 is preferably made of a robust material, e.g., metal or the like.

For instance, a controller (not illustrated) configured to control operations of the measurement machine 1 may be housed in the frame 4.

The measurement machine 1 includes a position measurement section facing the holding section 31 of the table 3 and configured to measure a position of the holding section 31. The position measurement section may have any configuration capable of measuring the position of the holding section 31 (i.e., a position of the measurement target W held by the holding section 31). For instance, in the exemplary embodiment, a laser measuring device 41 as the position measurement section is provided at the frame 4, as illustrated in FIG. 1. The laser measuring device 41 is, for instance, configured to branch light from a laser light source into a reference beam and a measurement beam, irradiate a retroreflector (not illustrated) arranged at the holding section 31 with the reference beam, and measure a distance from the laser measuring device 41 to the holding section 31 provided with the retroreflector on the basis of an interference beam between the measurement beam and the reference beam reflected off the retroreflector. Accordingly, the position of the holding section 31 in the Y direction can be measured. The measurement machine 1 further includes another laser measuring device configured to measure a position of the holding section 31 in the X direction, though illustration thereof is omitted in FIG. 1.

It should be noted that the laser measuring device 41 described above is an example of the position measurement section, and a different configuration may be employed in which the position of the holding section 31 is measured by encoders provided at drive shafts of the X-axis movement mechanism 321 and the Y-axis movement mechanism 322 or the position of the holding section 31 is measured by a scale and a detector configured to detect graduations of the scale.

In the exemplary embodiment, the plurality of arms 6 are fixed to the frame 4, and the measurement unit 5 (the first measurement unit 51 and the second measurement unit 52) is supported by the frame 4 through the plurality of arms 6. Therefore, arm fixing sections 42 (see FIG. 5) for fixing these arms 6 are provided at the frame 4, and fixed pieces 62 that are components of the arms 6 are fixed to the respective arm fixing sections 42.

Configuration of Arms 6

Outline of Arms 6

Figure 2:
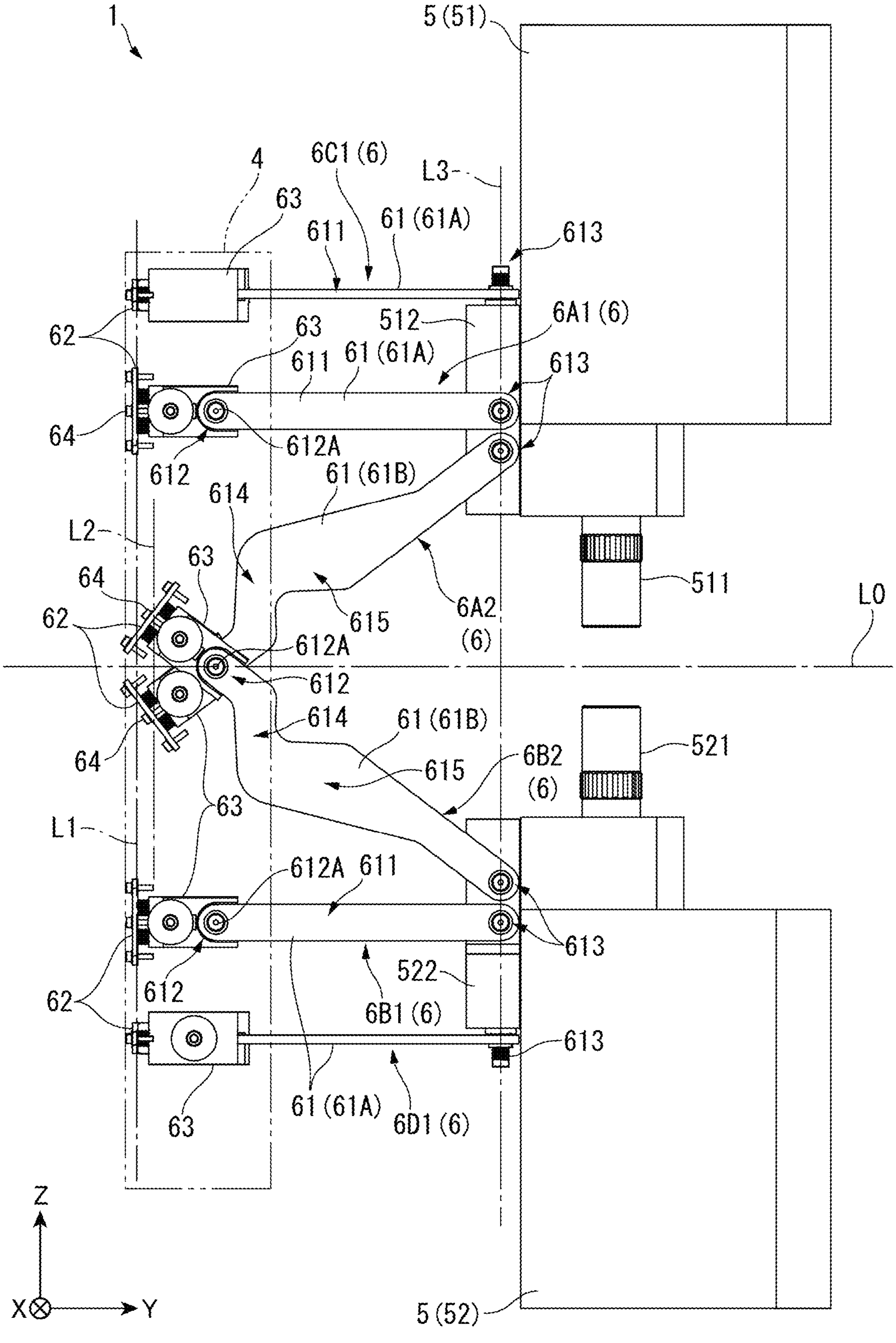
FIG. 2 is a side view of the measurement machine according to the exemplary embodiment viewed from a −X direction.
Figure 3:
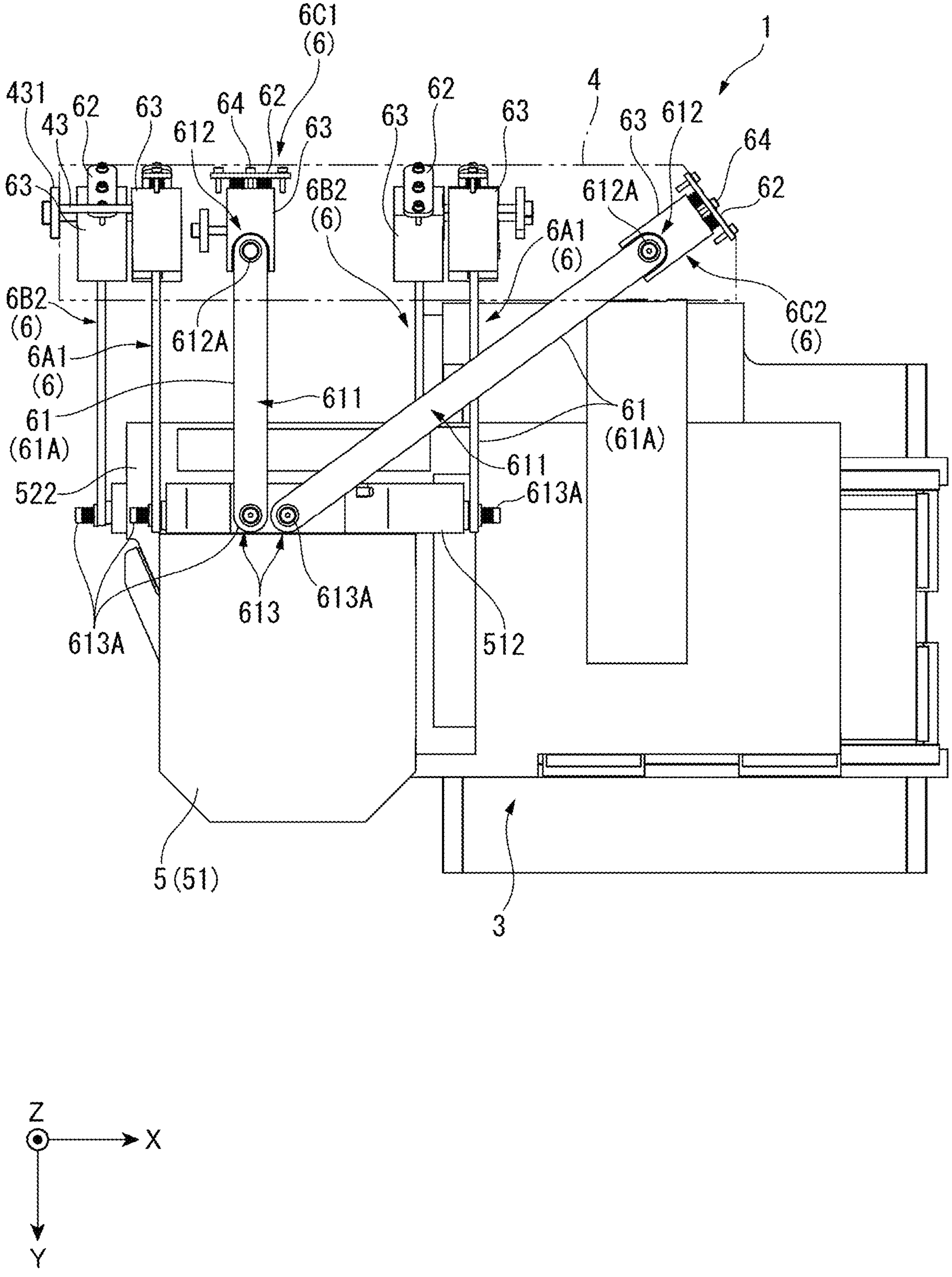
FIG. 3 is a plan view of the measurement machine according to the exemplary embodiment viewed from a +Z direction.

FIG. 2 is a side view of the measurement machine 1 of the exemplary embodiment viewed from the −X direction. FIG. 3 is a plan view of the measurement machine 1 of the exemplary embodiment viewed from the +Z direction.

In the exemplary embodiment, the arms 6 disposed in a lateral direction (at ±X side edges) of the first measurement unit 51 and the second measurement unit 52 are Z-axis support arms in the present disclosure. Of the Z-axis support arms, the arms 6 provided in the lateral direction (at the ±X side edges) of the first measurement unit 51 are defined as first Z-axis support arms 6A1 and 6A2 in the present disclosure. The arms 6 provided in the lateral direction of the second measurement unit 52 are defined as second Z-axis support arms 6B1 and 6B2.

On the other hand, the arms 6 provided at an upper side (in the +Z direction) of the first measurement unit 51 and at a lower side (in the −Z direction) of the second measurement unit 52 are X-axis support arms in the present disclosure. Of the X-axis support arms, the arms 6 provided at the upper side of the first measurement unit 51 are defined as first X-axis support arms 6C1 and 6C2 and the arms 6 provided at the lower side of the second measurement unit 52 are defined as second X-axis support arms 6D1 and 6D2.

As illustrated in FIG. 2, in the measurement machine 1 when viewed from the −X direction, of the two first Z-axis support arms 6A1 and 6A2 connected to a −X side of the first plate 512 of the first measurement unit 51, the first Z-axis support arm 6A1 in the +Z direction is arranged parallel to the Y direction and the first Z-axis support arm 6A2 in the −Z direction is arranged to be inclined with respect to the Y direction so that a part in a +Y direction thereof is positioned in the +Z direction from a part in a −Y direction.

Of the two second Z-axis support arms 6B1 and 6B2 connected to a −X side of the second plate 522 of the second measurement unit 52, the second Z-axis support arm 6B1 in the −Z direction is arranged parallel to the Y direction and the second Z-axis support arm 6B2 in the +Z direction is arranged to be inclined with respect to the Y direction so that a part in a +Y direction thereof is positioned in the −Z direction from a part in a −Y direction. It should be noted that, as illustrated in FIG. 3, the second Z-axis support arms 6B1 and 6B2 connected to the −X side of the second measurement unit 52 are located in the −X direction, at a predetermined distance, from the two first Z-axis support arms 6A1 and 6A2 connected to the −X side edge of the first measurement unit 51. Consequently, a −X edge of the second plate 522 of the second measurement unit 52 protrudes beyond a −X edge of the first plate 512 in the −X direction.

The first Z-axis support arms 6A1 and 6A2 disposed at the +X side edge of the first measurement unit 51 are similar to the first Z-axis support arms 6A1 and 6A2 disposed at the −X side edge of the first measurement unit 51. Specifically, of the first Z-axis support arms 6A1 and 6A2 connected to the +X side of the first measurement unit 51, the first Z-axis support arm 6A1 disposed in the +Z direction is arranged parallel to the Y direction and the first Z-axis support arm 6A2 disposed in the −Z direction is arranged to be inclined with respect to the Y direction.

The second Z-axis support arms 6B1 and 6B2 disposed in a +X direction of the second measurement unit 52 are similar to the second Z-axis support arms 6B1 and 6B2 disposed in the −X direction of the second measurement unit 52. The second Z-axis support arm 6B1 in the −Z direction is arranged parallel to the Y direction and the second Z-axis support arm 6B2 in the +Z direction is arranged to be inclined with respect to the Y direction. It should be noted that, as illustrated in FIG. 3, the two first Z-axis support arms 6A1 and 6A2 connected to the +X side edge of the first measurement unit 51 are located in the +X direction, at a predetermined distance, from the two second Z-axis support arms 6B1 and 6B2 connected to the +X side edge of the of the second measurement unit 52. Consequently, a +X edge of the first plate 512 of the first measurement unit 51 protrudes beyond a +X edge of the second plate 522 in the +X direction.

As illustrated in FIG. 3, of the two first X-axis support arms 6C1 and 6C2 connected to a +Z side edge of the first measurement unit 51, the first X-axis support arm 6C1 in the −X direction is arranged parallel to the Y direction and the first X-axis support arm 6C2 in the +X direction is arranged to be inclined with respect to the Y direction so that a part in a +Y direction thereof is positioned in the −X direction from a part in a −Y direction. Similarly, of the two second X-axis support arms 6D1 and 6D2 connected to a −Z side edge of the second measurement unit 52, the second X-axis support arm 6D1 in the −X direction is arranged parallel to the Y direction and the second X-axis support arm 6D2 (see FIG. 6) in the +X direction is arranged to be inclined with respect to the Y direction so that a part in a +Y direction thereof is positioned in the −X direction from a part in a −Y direction.

The first X-axis support arms 6C1 and 6C2 and the second X-axis support arms 6D1 and 6D2 are arranged at positions to be symmetrical with respect to an XY plane passing through the center of the first measurement unit 51 and the second measurement unit 52.

Detailed Configuration of Each Arm 6

The arms 6 each include an arm 61, the fixed piece 62, an arm support part 63, and an adjustment screw 64. It should be noted that the fixed piece 62, the arm support part 63, and the adjustment screw 64 configure an arm fixing mechanism in the present disclosure.

Configuration of Arm 61

The arm 61 is, for instance, a longitudinal flat plate member made of a material having a small thermal expansion coefficient such as invar.

Here, the arms 61 of the first Z-axis support arms 6A1 and 6A2 and the second Z-axis support arms 6B1 and 6B2 disposed in the lateral direction (the +X directions) of the measurement unit 5 are arranged so that planar directions of the flat plates of the arms 61 are along a ZY plane. This arrangement makes it possible to inhibit the arms 61 from bending in the Z direction due to the gravity of the measurement unit 5. Also, the arms 61 of the first X-axis support arms 6C1 and 6C2 disposed on a +Z side of the first measurement unit 51 and the second X-axis support arms 6D1 and 6D2 disposed on a −Z side of the second measurement unit 52 are arranged so that planar directions of the flat plates of the arms 61 are along the XY plane. This arrangement makes it possible to inhibit a shift of the first measurement unit 51 and the second measurement unit 52 in the X direction.

In the exemplary embodiment, a planar shape (i.e., a shape viewed from a thickness direction) of each arm 61 is a linear shape, in the first Z-axis support arms 6A1, the second Z-axis support arms 6B1, and the X-axis support arms (the first X-axis support arms 6C1 and 6C2 and the second X-axis support arms 6D1 and 6D2). In contrast, a planar shape (i.e., a shape viewed from the thickness direction) of each arm 61 is a curved shape, in the first Z-axis support arms 6A2 and the second Z-axis support arms 6B2. Hereinafter, the arm 61 having a linear planar shape is referred to as a linear arm 61A and the arm 61 having a curved planar shape is referred to as a curved arm 61B.

As illustrated in FIG. 2, the linear arm 61A includes a linear part 611 having a pair of linear edges parallel to each other along a longitudinal direction of the linear arm 61A, a frame-side arm end 612 having an arc-shaped edge at one end of the linear part 611 close to the frame 4, and a measurement-unit-side arm end 613 at the other end of the linear part 611 close to the measurement unit 5.

The frame-side arm end 612 is supported by the arm support part 63 so that the frame-side arm end 612 is pivotable on a frame-side pivot shaft 612A.

The measurement-unit-side arm end 613 is connected to the first plate 512 or the second plate 522 of the measurement unit 5 so that the measurement-unit-side side arm end 613 is pivotable on a measurement-unit-side pivot shaft 613A.

On the other hand, as illustrated in FIG. 2, the curved arm 61B has a frame-side arm end 612, a first curved section 614, a second curved section 615, and a measurement-unit-side arm end 613.

The frame-side arm end 612, which is configured similarly to that of the linear arm 61A, has an arc-shaped edge close to the frame 4 and is pivotally supported by the arm support part 63.

The measurement-unit-side arm end 613, which is configured similarly to that of the linear arm 61A, has an arc-shaped edge close to the measurement unit 5 and is pivotally connected to the first plate 512 or the second plate 522 of the measurement unit 5.

The curved arm 61B extends from the frame-side arm end 612 in a longitudinal direction of the curved arm 61B, and is curved substantially in the Z direction at the first curved section 614. It should be noted that the longitudinal direction of the arm 61 is a direction from the frame-side pivot shaft 612A toward the measurement-unit-side pivot shaft 613A. Hereinafter, the longitudinal direction of the arm 61 is occasionally referred to as an Xarm direction (see FIGS. 4A, 4B and 5). Also, a width direction of the arm 61 orthogonal to the Xarm direction (a direction orthogonal to the Xarm direction in the planar direction of the arm 61 having a flat plate shape) is occasionally referred to as a Yarm direction (see FIGS. 4A, 4B and 5), and a thickness direction of the arm 61 having the flat plate shape is occasionally referred to as a Zarm direction (see FIGS. 4A, 4B and 5).

Along a direction from the frame-side arm end 612 toward the measurement-unit-side arm end 613, the curved arm 61B is curved at the first curved section 614 from the Xarm direction into the Z direction, is curved at the second curved section 615 into a +Xarm direction, and further extends from the second curved section 615 along the Xarm direction to be the measurement-unit-side arm end 613 at a tip end of the curved arm 61B. A width in the Z direction of the second curved section 615 is large at a portion close to the first curved section 614, and the width in the Z direction is gradually reduced toward the measurement-unit-side arm end 613. Accordingly, a width dimension in the Z-direction at the first curved section 614 and the second curved section 615 is large, and bending of the curved arm 61B in the Z direction is further inhibited.

Configuration of Fixed Piece 62

Figure 4A:
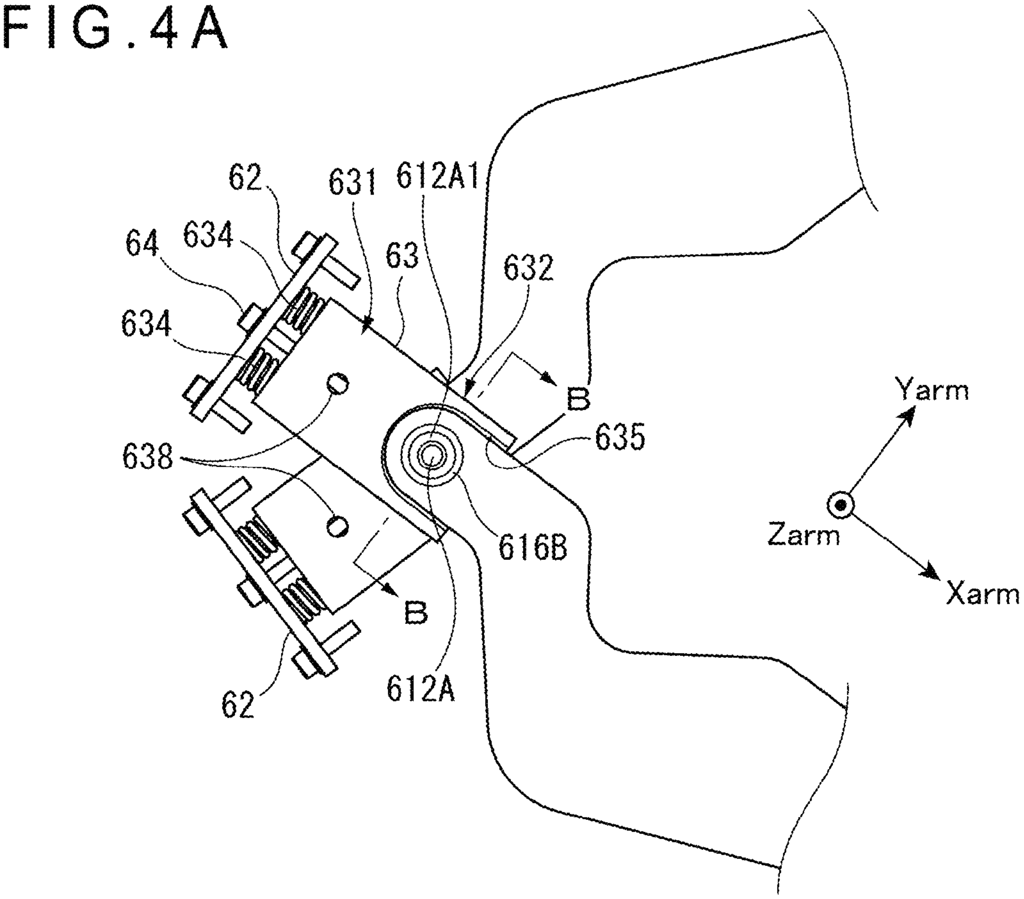
FIG. 4A illustrates an arm fixing mechanism of arms according to the exemplary embodiment, which is a plan view of a part of the arms disposed in the −X direction viewed from the −X direction.
Figure 4B:
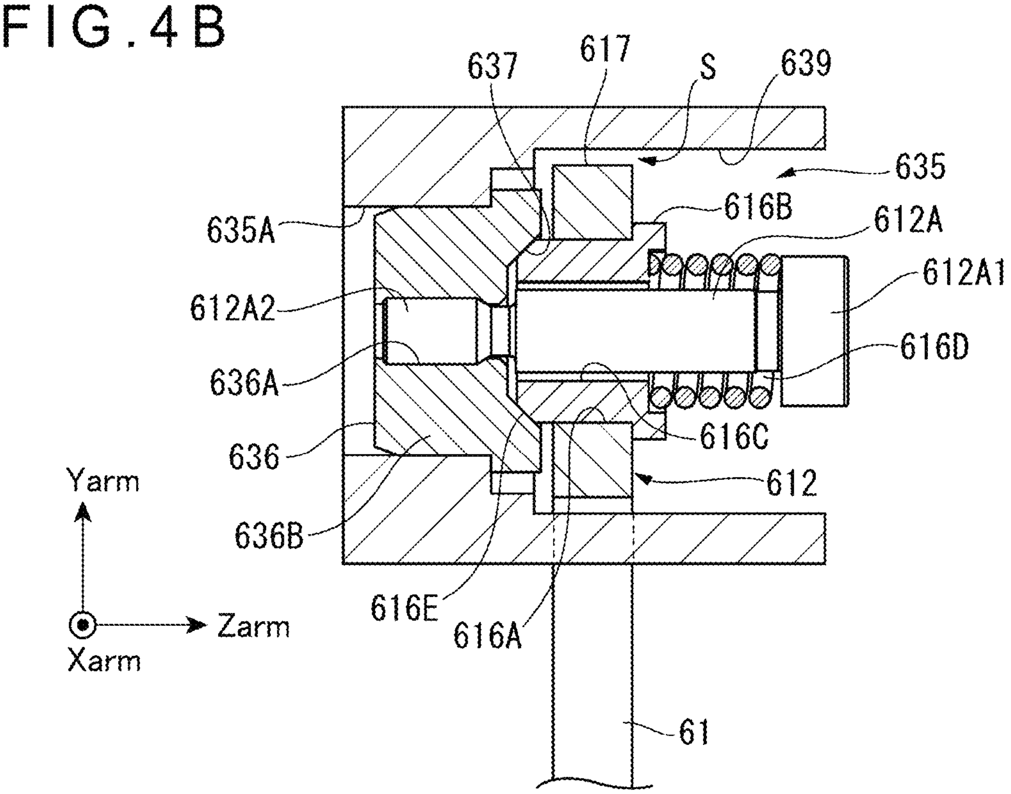
FIG. 4B illustrates the arm fixing mechanism of the arms according to the exemplary embodiment, which is a cross-sectional view taken along a line B-B in FIG. 4A.
Figure 5:
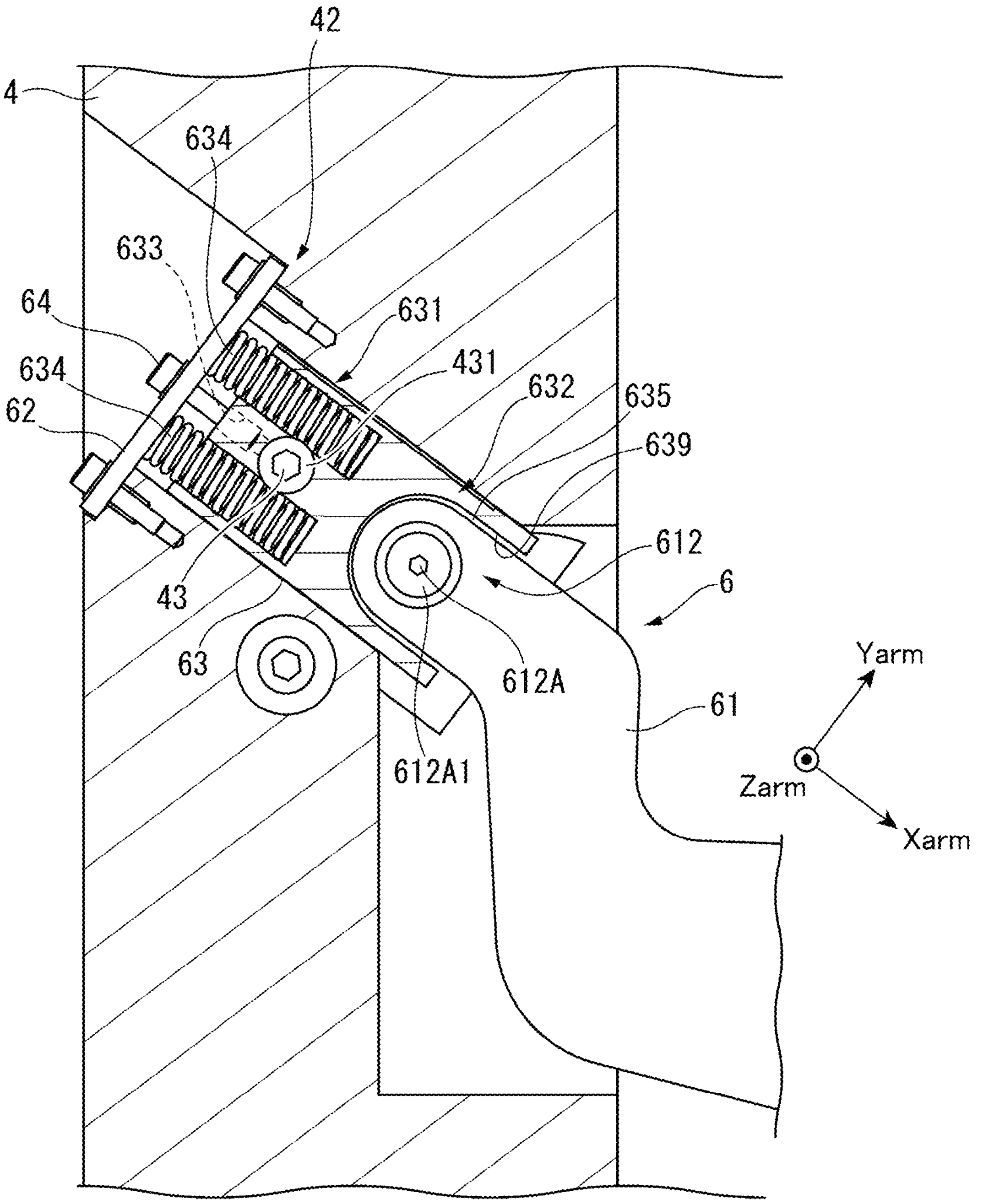
FIG. 5 is a cross-sectional view illustrating a part of the arm according to the exemplary embodiment cut at a plane passing through a middle point in a thickness direction of the arm.

FIGS. 4A and 4B are views illustrating the arm fixing mechanism of the arms 6. FIG. 4A is a plan view of a part of the arms 6 disposed in the −X direction when viewed from the −X direction, and FIG. 4B is a cross-sectional view taken along a B-B line in FIG. 4A. FIG. 5 is a cross-sectional view illustrating a part of the arm 6 cut at an Xarm-Yarm plane passing through a middle point in the thickness direction (Zarm direction). It should be noted that FIGS. 4A, 4B and 5 illustrate a configuration example of the arm 6 having the curved arm 61B, and the arm 6 having the linear arm 61A has a similar configuration.

As described above, the fixed piece 62 is fixed to the arm fixing section 42 (see FIG. 5) of the frame 4. The fixed piece 62 is a plate-shaped member made of, for instance, metal or the like, and fixed to the frame 4 by a predetermined fixing member. In the exemplary embodiment, as illustrated in the drawings such as FIGS. 4A and 4B, the fixed piece 62 is fixed to the frame 4 by screwing. It should be noted that a fixing method of the fixed piece 62 is not limited thereto, and besides the screwing, the fixed piece 62 may be fixed to the frame 4 by an adhesive, by both of screwing and an adhesive, or by a different fixing method.

The fixed piece 62 is provided with an adjustment hole through which the adjustment screw 64 is inserted.

Configuration of Arm Support Part 63

As illustrated in FIGS. 4A, 4B and 5, the arm support part 63 is attached to the fixed piece 62 through the adjustment screw 64. Specifically, the arm support part 63 is provided with a support adjusting section 631 and a pivot supporting section 632 arranged substantially along the longitudinal direction (Xarm direction) of the arm 61.

The support adjusting section 631 is provided with a screw hole 633 (see FIG. 5) into which the adjustment screw 64 is screwed.

Further, holding parts 634 are provided between the support adjusting section 631 and the fixed piece 62. Examples of the holding parts 634 may include springs, and the holding parts 634 hold the arm support part 63 in a direction away from the fixed piece 62. It should be noted that, though the springs are exemplified as the holding parts 634 in the exemplary embodiment, a different holding member such as an elastic rubber may be used. A configuration example in which two springs are provided with the screw hole 633 therebetween is described in the exemplary embodiment. However, a single spring having a center axis at the screw hole 633 and the adjustment screw 64 screwed into the screw hole 633 may be provided, or three or more springs may be arranged.

In the exemplary embodiment, by turning the adjustment screw 64, the arm support part 63 supporting the arm 61 moves toward and away from the fixed piece 62, which makes it possible to extend and contract the arm 6. Accordingly, a length of each arm 6 can be finely adjusted, and thus a position and posture of the measurement unit 5 with respect to the frame 4 can be finely adjusted.

Further, as illustrated in FIG. 4A, a positioning hole 638 is provided at a +Zarm surface of the arm support part 63. The positioning hole 638 is a screw hole, into which a fixing bolt 43 is screwed.

A cover surface of the frame 4 is disposed in the +Zarm direction of the arm support part 63, and the fixing bolt 43 is inserted through a hole provided at the cover surface and is screwed into the positioning hole 638. By screwing and fastening the fixing bolt 43 into the positioning hole 638, a fixing bolt head 431 of the fixing bolt 43 is pressed against the cover surface of the frame 4, and a position of the arm support part 63 with respect to the frame 4 is firmly fixed.

The pivot supporting section 632 of the arm support part 63 pivotally supports the frame-side arm end 612 of the arm 61. As illustrated in FIGS. 4A, 4B and 5, the pivot supporting section 632 is provided with a groove 635 extending from the +Zarm direction to the −Zarm direction and having a predetermined depth, in planar view viewed from the Zarm direction. The groove 635 is formed into a substantially U-like shape having an open end close to the arm 61 (in the +Xarm direction), and the frame-side arm end 612 is disposed in the groove 635 so that the arm 61 extends in the +Xarm direction from the open end.

Support Structure for Arm 61

Next, a support structure of supporting the arm 61 by the arm support part 63 will be specifically described.

As illustrated in FIG. 4B, a shaft press-in hole 635A is provided at a bottom portion of the groove 635, and a press-in shaft section 636B of a shaft support section 636 is fitted into the shaft press-in hole 635A. The shaft support section 636 is provided with a shaft hole section 636A having an axial center parallel to the Zarm direction.

Meanwhile, as illustrated in FIG. 4B, the frame-side arm end 612 of the arm 61 is provided with a shaft hole 616A penetrating in the Zarm direction, and a fitting part 616B is fitted into the shaft hole 616A. The fitting part 616B is provided with a pivot shaft insertion hole 616C penetrating in the Zarm direction, and the frame-side pivot shaft 612A is inserted through the pivot shaft insertion hole 616C. A shaft diameter (a diameter orthogonal to the Zarm direction) of the frame-side pivot shaft 612A is slightly smaller than a hole diameter (a diameter orthogonal to the Zarm direction) of the pivot shaft insertion hole 616C. A bolt head section 612A1 is provided at a +Zarm end of the frame-side pivot shaft 612A. A dimension of the bolt head section 612A1 in a direction orthogonal to the Zarm direction is greater than the hole diameter of the pivot shaft insertion hole 616C, and springs 616D are disposed between the bolt head section 612A1 and the fitting part 616B. Further, a bolt screw section 612A2 that is inserted through the shaft hole section 636A is provided at a −Zarm end of the frame-side pivot shaft 612A.

The arm 61 is supported to be pivotable with respect to the arm support part 63.

For instance, in the exemplary embodiment, a conical tapered surface (a shaft-support-side tapered surface 637) is provided on a +Zarm surface of the shaft support section 636. The shaft-support-side tapered surface 637 has a concave shape centered on the axial center of the shaft hole section 636A. In addition, a conical tapered surface (an arm-side tapered surface 616E) having a convex shape is provided on a −Zarm surface of the fitting part 616B.

The press-in shaft section 636B of the shaft support section 636 is press-fitted into the shaft press-in hole 635A, and thereby the frame-side pivot shaft 612A is fixed to the arm support part 63. Further, the fitting part 616B is biased in the −Zarm direction by the springs 616D, and thereby the arm-side tapered surface 616E is fitted into the shaft-support-side tapered surface 637.

In the exemplary embodiment, the structure described above allows the arm 61 to be pivotally supported by the arm support part 63.

In the exemplary embodiment, as illustrated in FIG. 4B, a gap S is provided between a side wall 639 having a U shape that defines the groove 635 of the arm support part 63 and a side wall 617 of the arm 61. Accordingly, pivotal movement of the arm 61 with respect to the arm support part 63 is allowed in a range corresponding to the gap S, and for instance, a dimensional change due to thermal expansion of the frame 4 or the like can be absorbed.

Connection of Arm 61 to Measurement Unit 5

As a configuration of connecting the measurement-unit-side arm end 613 of the arm 61 to the measurement unit 5, a configuration similar to that of the frame-side pivot shaft 612A can be employed.

Specifically, the measurement-unit-side arm end 613 of the arm 61 is provided with a second shaft hole (not illustrated) penetrating in the Zarm direction, and the measurement-unit-side pivot shaft 613A having the same configuration as the frame-side pivot shaft 612A is inserted into the second shaft hole.

Further, another shaft support section having the same configuration as the shaft support section 636 of the arm support part 63 is fixed to a plate section (the first plate 512 and the second plate 522) of the measurement unit 5, and a press-in shaft section of the measurement-unit-side pivot shaft 613A is press-fitted into a shaft press-in hole of the other shaft support section.

Positions of Fixed Points of Arms 6 in Measurement Machine 1

In the exemplary embodiment, in a projection viewed from the X direction as illustrated in FIG. 2, the first Z-axis support arms 6A1 and 6A2 connected to the +X side edges of the first measurement unit 51 and the second Z-axis support arms 6B1 and 6B2 connected to the +X side edges of the second measurement unit 52 are symmetrical with respect to a reference line L0 parallel to the Y direction and passing through a middle point between the first measurement unit 51 and the second measurement unit 52. Here, the first Z-axis support arm 6A1 disposed in the +Z direction among the first Z-axis support arms 6A1 and 6A2 and the second Z-axis support arm 6B1 disposed in the −Z direction among the second Z-axis support arms 6B1 and 6B2 are paired together and symmetrical with respect to the reference line L0, and the first Z-axis support arm 6A2 and the second Z-axis support arm 6B2 are paired together and symmetrical with respect to the reference line L0.

In the exemplary embodiment, respective fixed positions to the frame 4 of the first Z-axis support arm 6A1 and the second Z-axis support arm 6B1 paired together have a same Y coordinate. Similarly, respective fixed positions to the frame 4 of the first Z-axis support arm 6A2 and the second Z-axis support arm 6B2 paired together have a same Y coordinate. Here, the fixed position to the frame 4 refers to a contact point between the fixed piece 62 fixed to the frame 4 and the adjustment screw 64.

In other words, in the projection viewed from the X direction as illustrated in FIG. 2, the respective fixed positions to the frame 4 of the first Z-axis support arm 6A1 and the second Z-axis support arm 6B1 are arranged side by side on an imaginary straight line L1 (first imaginary line) parallel to the Z direction. Similarly, the respective fixed positions to the frame 4 of the first Z-axis support arm 6A2 and the second Z-axis support arm 6B2 are arranged side by side on an imaginary straight line L2 (first imaginary line) parallel to the Z direction.

In the first Z-axis support arms 6A1 and 6A2 and the second Z-axis support arms 6B1 and 6B2, the measurement-unit-side pivot shaft 613A of each arm 61 is pivotally connected to the first plate 512 or the second plate 522 of the measurement unit 5. That is, the measurement-unit-side pivot shafts 613A serve as respective fixed positions to the measurement unit 5 of the first Z-axis support arms 6A1 and 6A2 and the second Z-axis support arms 6B1 and 6B2.

Here, a fixed position to the first measurement unit 51 of the first Z-axis support arm 6A1 and a fixed position to the second measurement unit 52 of the second Z-axis support arm 6B1 that is paired with the first Z-axis support arm 6A1 have a same Y coordinate. Similarly, a fixed position to the first measurement unit 51 of the first Z-axis support arm 6A2 and a fixed position to the second measurement unit 52 of the second Z-axis support arm 6B2 that is paired with the first Z-axis support arm 6A2 have a same Y coordinate. It should be noted that, in the exemplary embodiment, Y coordinates of the fixed positions to the measurement unit 5 of the four arms 6, which are the first Z-axis support arms 6A1 and 6A2 and the second Z-axis support arms 6B1 and 6B2, are in the same position. That is, in the projection viewed from the X direction, the fixed positions of the four arms 6 to the measurement unit 5 are arranged side by side on an imaginary straight line L3 (second imaginary line) parallel to the Z direction.

Figure 6:
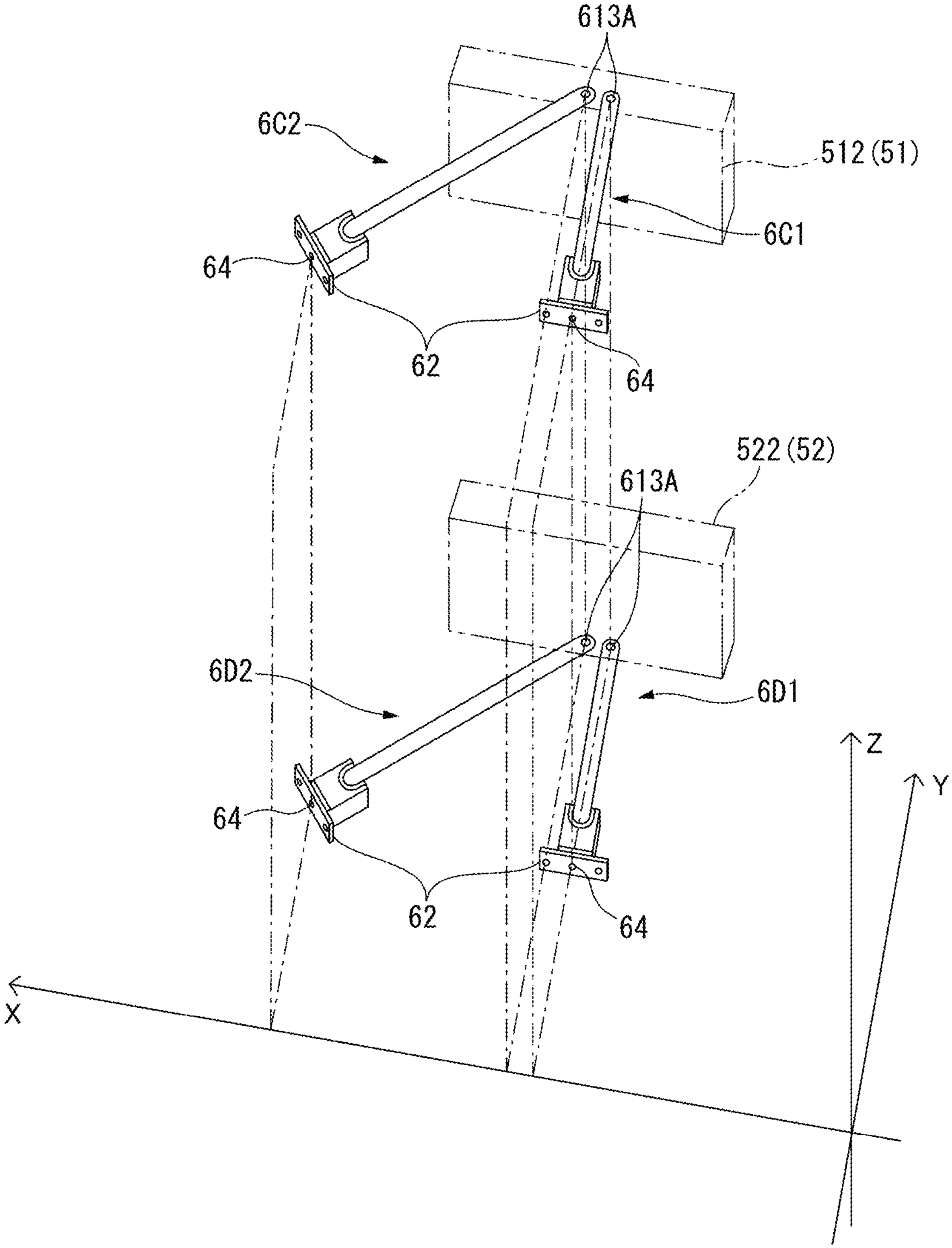
FIG. 6 is a schematic perspective view illustrating a positional relationship of X-axis support arms according to the exemplary embodiment.

FIG. 6 is a schematic perspective view illustrating a positional relationship between the first X-axis support arms 6C1 and 6C2 and the second X-axis support arms 6D1 and 6D2.

The first X-axis support arms 6C1 and 6C2 connected to the +Z side edge of the first measurement unit 51 and the second X-axis support arms 6D1 and 6D2 connected to the −Z side edge of the of the second measurement unit 52 are symmetrically arranged with respect to an XY plane (reference plane) passing through a middle point between the first measurement unit 51 and the second measurement unit 52. In the first X-axis support arms 6C1 and 6C2 and the second X-axis support arms 6D1 and 6D2 symmetrical with respect to the reference plane, the first X-axis support arm 6C1 and the second X-axis support arms 6D1 are paired together, and the first X-axis support arm 6C2 and the second X-axis support arms 6D2 are paired together.

Respective fixed positions to the frame 4 of the first X-axis support arm 6C1 and the second X-axis support arms 6D1 paired together have a same X coordinate (and a same Y coordinate). Similarly, respective fixed positions (the frame-side pivot shaft 612A) to the frame 4 of the first X-axis support arm 6C2 and the second X-axis support arm 6D2 paired together have a same X coordinate (and a same Y coordinate). It should be noted that the fixed position to the frame 4 refers to a contact point between the fixed piece 62 fixed to the frame 4 and the adjustment screw 64 in a similar manner to the above description.

Further, a fixed position to the first measurement unit 51 of the first X-axis support arm 6C1 and a fixed position to the second measurement unit 52 of the second X-axis support arm 6D1 that is paired with the first X-axis support arm 6C1 have a same X coordinate (and a same Y coordinate). Similarly, a fixed position to the first measurement unit 51 of the first X-axis support arm 6C2 and a fixed position to the second measurement unit 52 of the second X-axis support arm 6D2 that is paired with the first X-axis support arm 6C2 have a same X coordinate (and a same Y coordinate).

In the configuration as described above, even if a dimensional change of the frame 4 due to a temperature change occurs, an error caused by the dimensional change can be absorbed.

Specifically, since the arms 61 of the exemplary embodiment are each made of a material with an extremely small thermal expansion coefficient such as invar, a dimensional change of each arm 6 due to the temperature change is sufficiently small to be ignorable. In contrast, the frame 4 may be slightly changed in dimension due to the temperature change. However, in the configuration as described above, a posture change amount of the first measurement unit 51 with respect to the frame 4 and a posture change amount of the second measurement unit 52 with respect to the frame 4, which are caused by the dimensional change of the frame 4, are the same amount, and as a result, the positional relationship between the first measurement unit 51 and the second measurement unit 52 is kept. Consequently, a relative position of the second measurement unit 52 with respect to the first measurement unit 51 is not affected by the dimensional change of the frame 4 due to the temperature change, and a positional change of the first measurement unit 51 and the second measurement unit 52 with respect to the reference line L0 can be inhibited.

Effects of the Exemplary Embodiment

The measurement machine 1 of the exemplary embodiment includes: the holding section 31 where the measurement target W is held; the measurement unit (the first measurement unit 51 and the second measurement unit 52) arranged at a position facing the holding section 31 and provided with the measurement sensors 511 and 521 that perform a measurement process on the measurement target W; the frame 4; and the plurality of arms 6 that couple the frame 4 with the measurement unit 5.

In the measurement machine 1 configured as above, maintenance of the measurement unit 5 can be more easily performed. Specifically, in a conventional measurement machine in which a measurement sensor is directly fixed to a frame, it is difficult to perform maintenance of the measurement sensor because operations on the frame are necessary and access to the measurement sensor is inconvenient. For instance, in order to adjust a position of the measurement sensor, a fixed structure of the measurement sensor fixed to the frame needs to be directly adjusted, which requires operations such as disassembling the frame and exposing the measurement sensor. On the contrary, in the exemplary embodiment, even in the case where the position and posture of the measurement unit 5 with respect to the frame 4 need to be finely adjusted before the use of the measurement machine 1, the position and posture of the measurement unit 5 can be easily adjusted by finely adjusting the lengths of the arms 6. In addition, the frame 4 and the measurement unit 5 are spaced apart from each other by the presence of the arms 6 to provide a space between the frame 4 and the measurement unit 5. This facilitates access to the measurement unit 5 from the space and also adjustment work of the arms 6.

Further, in the measurement machine 1 of the exemplary embodiment, when the arm 61 is made of a material with a small thermal expansion coefficient such as invar, influence of the temperature change can be reduced. Namely, in the case where a measurement sensor is directly fixed to a frame as in a conventional measurement machine, it is necessary to inhibit the influence of the temperature change by forming the entirety of the frame with a material having a small thermal expansion coefficient in order to inhibit a shift of the measurement sensor due to the temperature change, which increases the cost. In contrast, in the measurement machine 1 of the exemplary embodiment, only the arms 61 should be made of a material with a small thermal expansion coefficient, and the entirety of the frame 4 needs not be made of a material having a small thermal expansion coefficient and may be made of any types of material. Thus, the measurement machine 1 can be reduced in cost.

In the measurement machine 1 of the exemplary embodiment, the plurality of arms 6 include a plurality of Z-axis support arms (the first Z-axis support arms 6A1 and 6A2, and the second Z-axis support arms 6B1 and 6B2) arranged along the Z direction, and a plurality of X-axis support arms (the first X-axis support arms 6C1 and 6C2, and the second X-axis support arms 6D1 and 6D2) arranged along the X direction.

In this configuration, movement of the measurement unit 5 in the Z direction can be inhibited by the Z-axis support arms, and movement of the measurement unit 5 in the X direction can be restricted by the X-axis support arms. Further, since a position of the measurement unit 5 in the Y direction is determined by the Z-axis support arms and the X-axis support arms, movement of the measurement unit 5 in the Y direction can also be restricted. Accordingly, a position of the measurement unit 5 with respect to the frame 4 can be fixed at a desired position.

In the measurement machine 1 of the exemplary embodiment, the measurement unit 5 includes the first measurement unit 51 disposed at a position facing the +Z surface (the first surface) of the measurement target W held by the holding section 31 and the second measurement unit 52 disposed at a position facing the −Z surface (the second surface) of the measurement target W, and each of the first measurement unit 51 and the second measurement unit 52 is connected to the frame 4 through the plurality of arms 6.

Accordingly, surface shapes of the +Z surface and the −Z surface of the measurement target W can be simultaneously measured.

In particular, in the case where the measurement target W, which is the light-transmissive WLO, is measured by the SIM sensor, a front surface shape and a rear surface shape at a same point are measured with the measurement axes of the first measurement unit 51 and the second measurement unit 52 aligned on the same axis. In the exemplary embodiment, positions and postures of the first measurement unit 51 and the second measurement unit 52 can be easily adjusted, and the measurement axes of the first measurement unit 51 and the second measurement unit 52 can be appropriately made coincident with each other.

In the exemplary embodiment, in the projection viewed from the X direction, the first Z-axis support arms 6A1 and 6A2 and the second Z-axis support arms 6B1 and 6B2 are respectively arranged at positions to be symmetrical with respect to the reference line L0, and the respective fixed positions to the frame 4 of the first Z-axis support arm 6A1 and the second Z-axis support arm 6B1 paired together are arranged side by side on the imaginary straight line L1 that is the first imaginary line. Similarly, the respective fixed positions to the frame 4 of the first Z-axis support arm 6A2 and the second Z-axis support arm 6B2 paired together are arranged side by side on the imaginary straight line L2 that is the first imaginary line. Further, the fixed position of the first Z-axis support arm 6A1 to the first measurement unit 51 and the fixed position of the second Z-axis support arm 6B1 to the second measurement unit 52 are arranged side by side on the imaginary straight line L3 that is the second imaginary line. Similarly, the fixed position of the first Z-axis support arm 6A2 to the first measurement unit 51 and the fixed position of the second Z-axis support arm 6B2 to the second measurement unit 52 are arranged side by side on the imaginary straight line L3.

With this arrangement, the dimensional change such as distortion of the frame 4 caused by the temperature change can be controlled by the first Z-axis support arms 6A1 and 6A2 and the second Z-axis support arms 6B1 and 6B2, and thus deviation in the positional relationship between the first measurement unit 51 and the second measurement unit 52 due to the dimensional change of the frame 4 and generation of measurement errors caused thereby can be inhibited.

In the measurement machine 1 of the exemplary embodiment, the first X-axis support arms 6C1 and 6C2 and the second X-axis support arms 6D1 and 6D2 are respectively arranged at positions to be symmetrical with respect to the reference plane, and the respective fixed positions to the frame 4 of the first X-axis support arm 6C1 and the second X-axis support arm 6D1 paired together have a same X coordinate. Similarly, the respective fixed positions to the frame 4 of the first X-axis support arm 6C2 and the second X-axis support arms 6D2 paired together have a same X coordinate.

Further, the fixed position of the first X-axis support arm 6C1 to the first measurement unit 51 and the fixed position of the second X-axis support arm 6D1 to the second measurement unit 52 have a same X coordinate, and similarly the fixed position of the first X-axis support arm 6C2 to the first measurement unit 51 and the fixed position of the second X-axis support arm 6D2 to the second measurement unit 52 have a same X coordinate.

Accordingly, in a similar manner to the above description, the dimensional change such as distortion of the frame 4 caused by the temperature change can be controlled by the first X-axis support arms 6C1 and 602 and the second X-axis support arms 6D1 and 6D2, and thus the deviation in the positional relationship between the first measurement unit 51 and the second measurement unit 52 due to the dimensional change of the frame 4 and generation of measurement errors caused thereby can be inhibited.

In the measurement machine 1 of the exemplary embodiment, the plurality of arms 6 are each configured so that the length in the longitudinal direction of the arm 6 is extendable and contractable.

Accordingly, the position and posture of the measurement unit 5 with respect to the frame 4 can be easily adjusted by extending and contracting the arms 6.

Specifically, the arms 6 each include: the arm 61 with a longitudinal shape; and the arm fixing mechanism provided at the end of the arm 61 close to the frame 4 in the longitudinal direction of the arm 61. The arm fixing mechanism includes: the fixed piece 62 fixed to the frame 4; the arm support part 63 that pivotally supports the arm 61; and the adjustment screw 64, corresponding to an adjustment unit in the invention, which couples the fixed piece 62 with the arm support part 63 and by which a position of the arm support part 63 is moved toward and away from the fixed piece 62 along the longitudinal direction of the arm 61.

Accordingly, the arm support part 63 can be moved toward and away from the fixed piece 62 by turning the adjustment screw 64, which makes it possible to easily adjust the length of the arm 6 in the longitudinal direction (Xarm direction).

MODIFICATIONS

It should be noted that the invention is not limited to the above-described exemplary embodiment but includes modifications described below and the like as long as such modifications and the like are compatible with the object of the invention.

Modification 1

A configuration in which the first measurement unit 51 is supported by the six arms 6 including the two arms 6 in the +X direction, the two arms 6 in the −X direction and the two arms 6 in the +Z direction is exemplified in the above-described exemplary embodiment. However, a structure of supporting the first measurement unit 51 by seven or more arms 6 may be employed. For instance, the first measurement unit 51 may be supported by three or more arms 6 in each of the +X directions, and/or may be supported by three or more arms 6 in +Z direction. The same is applied to the second measurement unit 52.

Further, in the above-described exemplary embodiment, the arms 6 in the +Z direction disposed in the lateral direction (+X directions) of the first measurement unit 51 are each parallel to the Y direction and the arms 6 in the −Z direction are each inclined so that a part in a +Y direction thereof is positioned in the +Z direction from a part in a −Y direction. However, the invention is not limited to this arrangement. For instance, the arms 6 in the +Z direction disposed in the lateral direction of the first measurement unit 51 may be inclined with respect to the Y direction and the arms 6 in the −Z direction may be parallel to the Y direction. Further, both of the arms 6 may be parallel to the Y direction or may be inclined with respect to the Y direction.

The same is applied to the arms 6 disposed on the +Z side of the first measurement unit 51 and each of the arms 6 supporting the second measurement unit 52.

Modification 2

In the above-described exemplary embodiment, a configuration in which the fixed piece 62, the arm support part 63 and the adjustment screw 64 that serve as the arm fixing mechanism are provided at an end of each arm 6 near the frame 4 is employed. However, a similar arm fixing mechanism may be provided at an end of each arm 6 near the measurement unit 5. Alternatively, a similar arm fixing mechanism may be provided at both ends of each arm 6.

Modification 3

Although an example in which the measurement unit 5 includes the first measurement unit 51 and the second measurement unit 52 is described in the above-described exemplary embodiment, only the first measurement unit 51 may be provided, or three or more measurement units may be provided.

Modification 4

In the above-described exemplary embodiment, the arm fixing mechanism provided at one end of the arm 61, in which a distance between the fixed piece 62 and the arm support part 63 is adjusted by the adjustment screw 64, is exemplified as a configuration of changing the length of the arm 6. However, the invention is not limited to this mechanism.

For instance, a structure of extending and contracting the arm 61 may be provided at a middle point of the arm 61. As a specific example, the arm may be divided into a plurality of small arm parts. For instance, a configuration in which the arm is configured from a first part and a second part, and the second part is movable with respect to the first part along a longitudinal direction may be employed. In such a configuration, a length of the arm as a whole may be adjusted by fixing the first part and the second part by a screw of the like at a position where the length of the arm becomes a desired length.

What is claimed is:

1. A measurement machine comprising:

a holding section where a measurement target is held;

a measurement unit provided at a position facing the holding section and comprising a sensor, the sensor being configured to perform a measurement process on the measurement target;

a frame; and a plurality of arms that couples the frame with the measurement unit, wherein given that a direction extending from the measurement unit toward the measurement target is defined as a Z direction, a direction orthogonal to the Z direction is defined as an X direction, and a direction extending from the frame toward the measurement unit and being orthogonal to the X direction and the Z direction is defined as a Y direction, the plurality of arms comprise a plurality of Z-axis support arms arranged side by side along the Z direction and a plurality of X-axis support arms arranged side by side along the X direction.

2. The measurement machine according to claim 1, wherein the measurement unit comprises a first measurement unit and a second measurement unit, the first measurement unit being disposed at a position facing a first surface of the measurement target held by the holding section, the second measurement unit being disposed at a position facing a second surface of the measurement target held by the holding section, the second surface being opposite to the first surface, and each of the first measurement unit and the second measurement unit is coupled with the frame by the plurality of arms.

3. The measurement machine according to claim 2, wherein the plurality of the Z-axis support arms comprise a plurality of first Z-axis support arms that support the first measurement unit and a plurality of second Z-axis support arms that support the second measurement unit, in a projection viewed from the X direction, the plurality of first Z-axis support arms and the plurality of second Z-axis support arms are respectively arranged at positions to be symmetrical with respect to a reference line, the reference line including a middle point between the first measurement unit and the second measurement unit and being parallel to the Y direction, fixed positions of the first Z-axis support arms to the frame and fixed positions of the second Z-axis support arms to the frame are arranged side by side on a first imaginary line parallel to the Z direction, the second Z-axis support arms being symmetrical to the first Z-axis support arms with respect to the reference line, and fixed positions of the first Z-axis support arms to the first measurement unit and fixed positions of the second Z-axis support arms to the second measurement unit are arranged side by side on a second imaginary line parallel to the Z direction, the second Z-axis support arms being symmetrical to the first Z-axis support arms with respect to the reference line.

4. The measurement machine according to claim 2, wherein the plurality of the X-axis support arms comprise a plurality of first X-axis support arms that support the first measurement unit and a plurality of second X-axis support arms that support the second measurement unit, the plurality of first X-axis support arms and the plurality of second X-axis support arms are respectively arranged at positions to be symmetrical with respect to a reference plane, the reference plane including a middle point between the first measurement unit and the second measurement unit in the Z direction and being parallel to an XY plane, fixed positions of the first X-axis support arms to the frame and fixed positions of the second X-axis support arms to the frame have a same coordinate in the X direction, the second X-axis support arms being symmetrical to the first X-axis support arms with respect to the reference plane, and fixed positions of the first X-axis support arms to the first measurement unit and fixed positions of the second X-axis support arms to the second measurement unit have a same coordinate in the X direction, the second X-axis support arms being symmetrical to the first X-axis support arms with respect to the reference plane.

5. The measurement machine according to claim 1, wherein the plurality of arms are each configured so that a length of the arm in a longitudinal direction is extendable and contractable.

6. The measurement machine according to claim 5, wherein the plurality of arms each comprise an arm with an elongated shape, and an arm fixing mechanism provided at at least one of an end of the arm close to the frame or another end of the arm close to the measurement unit in a longitudinal direction of the arm, and the arm fixing mechanism comprises, a fixed piece fixed to the frame or the measurement unit, an arm support part that pivotally supports the arm, and an adjustment section which couples the fixed piece with the arm support part and by which a position of the arm support part is moved toward and away from the fixed piece along the longitudinal direction of the arm.

* * * * *